Figures 1, 2:
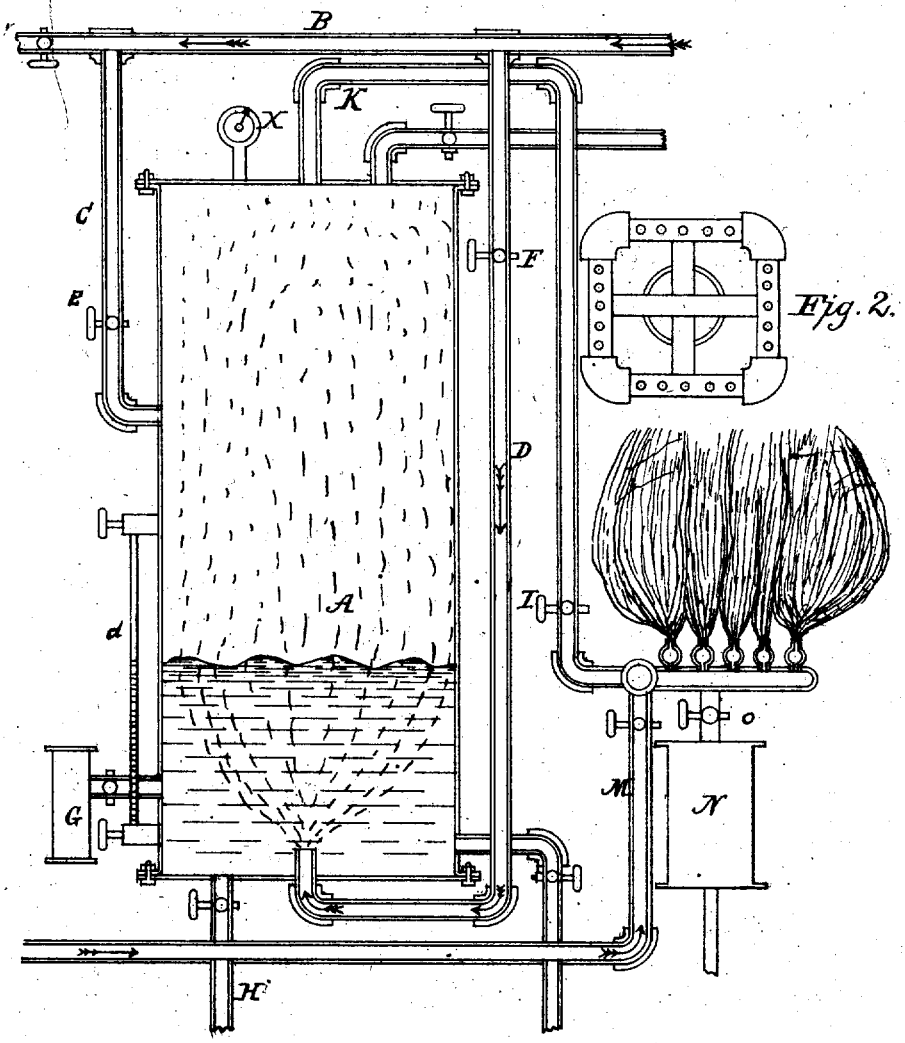

A. I. AMBLER,

Assignor, by mesne assignments, to THE INTERNATIONAL VAPOR FUEL CARBON IRON MANUFACTURING COMPANY.

PROCESS OF AND APPARATUS FOR GENERATING GAS FROM PETROLEUM.

No. 9,940. Reissued Nov. 22, 1881.

A. I. Ambler

INVENTOR.

WITNESSES.

F. M. Burnham

Daniel Breed.

ATTORNEY.

UNITED STATES PATENT OFFICE.

AUGUSTIN I. AMBLER, OF WASHINGTON, DISTRICT OF COLUMBIA, ASSIGNOR, BY MESNE ASSIGNMENTS, TO THE INTERNATIONAL VAPOR FUEL CARBON IRON MANUFACTURING COMPANY, OF SAME PLACE.

PROCESS OF AND APPARATUS FOR GENERATING GAS FROM PETROLEUM.

SPECIFICATION forming part of Reissued Letters Patent No. 9,940, dated November 22, 1881.

Original No. 118,575, dated August 29, 1871. Application for reissue filed April 25, 1881.

DIVISION A.

*To all whom it may concern:*

Be it known that I, AUGUSTIN I. AMBLER, of Washington, in the District of Columbia, have invented certain new and useful Improvements in Apparatus and Process for Generating Gas from Petroleum and other Oleaginous Substances; and I do hereby declare that the following is a full, clear, and exact description thereof, reference being had to the accompanying drawings, and to letters of reference marked thereon, which form a part of this specification.

My invention consists in subjecting petroleum and other liquid hydrocarbons in a receiver to the action of steam and retaining the steam and vapors generated thereby in such receiver under pressure until an inflammable gas is formed, which may be drawn off for combustion through a pipe constructed with a stop-cock to maintain the required pressure.

It also consists in an improved apparatus for carrying out the foregoing process, involving many novel features of construction and new modes of operation, as will be hereinafter fully described.

In Figure 1 of the drawings, which illustrates, in section, a form of apparatus which may be used in carrying my improved process into operation, A is the retort or generator containing the liquid hydrocarbon from which the vapor is generated, and also constituting the receiver in which the combined hydrocarbon vapor and steam are held under pressure.

B designates the steam-pipe for conveying steam from the boiler or other source of supply, which is provided with branch pipes C and D, communicating with the generator. The flow of steam through the pipe C entering the generator at any point above the liquid hydrocarbon is regulated by the valve E, and the flow of steam through the pipe D entering the generator at any point below the surface of the liquid hydrocarbon is regulated by the valve F. The liquid hydrocarbon may be supplied to the generator through a pipe entering the receiver at any desired point by means of a force-pump, G, or other suitable appliance, and a valve may be made use of for regulating the flow of the liquid hydrocarbon into the generator. When the process is so conducted that residuum remains in the receiver it may be drawn off through the pipe H. The amount of the hydrocarbon liquid in the receiver is indicated by the gage *d*, unless the heat of the steam is so great as to instantly vaporize it upon its entrance into the receiver, or entirely vaporize it afterward.

The pressure in the generator or retort, which is indicated by the steam-gage X, is regulated by the valve I in the pipe K, through which the vapor flows from the generator to the burner L. This burner (a plan of which is shown in Fig. 2) may be connected with another generator than that described by means of the pipe M, so that both or either may be used therewith. The burner may be supplied with hot or cold air from the chamber N by means of a force-pump, and the flow of such air may be regulated by the valve O; or hot air may be introduced into the receiver either above or below the oil.

The operation of the apparatus is as follows: If the valve F is open and the valve E closed, the steam will enter the generator only below the surface of the hydrocarbon liquid and vaporize it in a manner and to a degree dependent upon the heat of the entering steam and the nature of the hydrocarbon used. If the valve F is closed and the valve E open, the steam enters only above the hydrocarbon liquid, and the generation of the hydrocarbon vapor will be effected by the action of the steam upon the surface thereof. If both the valves F and E are open, the steam passing through the pipe D will be discharged into the hydrocarbon liquid, causing the vaporization of the same and convection among the particles thereof, and consequently a constantly-changing surface will be presented to the action of the steam entering through the pipe C. When steam has been allowed to flow through the pipe D for a short time and a proper amount of pressure—for instance, ten pounds—is indicated by the steam-gage X, the valve in the pipe I connecting the generator with the burner should be very slightly turned on, when the vapors will flow to the burner, and the same may be ignited. If the steam heat should be of such a character that the oil in the generator becomes too thick and dense to vaporize fully, its specific gravity will be increased, so as to give it a higher market value as a lubricating-oil, and it may be drawn off into a suitable tank for the new uses to which it may be adapted and its place supplied by oils of a lighter gravity.

Keeping in view the fact that my improvement in the art of generating vapors or gas from liquid hydrocarbons consists, primarily, in passing steam through the liquid and retaining the products under pressure, it is obvious that this result may be accomplished by the above apparatus in several different ways, depending upon the nature of the liquid used, the degree to which the entering steam is heated, and the manner in which the steam and oil is admitted into the generator or retort.

When crude petroleum is treated with live steam it is to a certain extent decomposed and vaporized, and the larger part of the vapors thus produced may be condensed, yielding benzine, naphtha, &c.; but by this process there is a very slight production of indestructible gases. When, however, crude petroleum is submitted to the action of steam under pressure and retained for a limited time under pressure, the product is materially different. It is true that the vapors mentioned are produced; but these vapors, while held under pressure in contact with steam, are themselves decomposed and form non-condensable and permanent gases. This result is due to the higher temperature resulting from pressure and the continuous contact with steam.

Having thus described my invention, I claim and desire to secure by Letters Patent of the United States—

1. The improvement in the art of generating an inflammable gas from petroleum, which consists in first vaporizing the gas-producing material by means of steam under regulated pressure, and then mixing steam with the vapor, as herein described.

2. A retort having a valve in the vapor outlet-pipe, by which the liquid hydrocarbons are held under pressure, and provided with a steam-pipe, which communicates with the interior of the retort below and above the surface of the liquid to be vaporized.

3. The combination of a retort, having means for holding the liquid hydrocarbons contained therein under pressure, with two steam-pipes, each of which is provided with valves, whereby the steam may be made to enter the retort either above or below the surface of the liquid hydrocarbons.

4. The combination of a generator containing oil, a steam-pipe entering below the surface of the oil, a steam-pipe entering above the surface of the oil, a pressure-regulating valve, and a steam-gage, as and for the purposes described.

In testimony whereof I affix my signature in presence of two witnesses.

A. I. AMBLER.

Witnesses:
F. M. BURNHAM,
I. B. ARCHER.